United States Patent
Murakami et al.

(10) Patent No.: US 9,423,947 B2
(45) Date of Patent: Aug. 23, 2016

(54) MOBILE ELECTRONIC DEVICE, CONTROL METHOD, AND STORAGE MEDIUM STORING CONTROL PROGRAM

(75) Inventors: Hideko Murakami, Yokohama (JP); Atsuo Chiba, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 198 days.

(21) Appl. No.: 13/587,027

(22) Filed: Aug. 16, 2012

(65) Prior Publication Data

US 2013/0047114 A1 Feb. 21, 2013

(30) Foreign Application Priority Data

Aug. 18, 2011 (JP) .................................. 2011-179258

(51) Int. Cl.
G06F 3/048 (2013.01)
G06F 3/0486 (2013.01)
G06F 3/0488 (2013.01)

(52) U.S. Cl.
CPC .......... *G06F 3/0486* (2013.01); *G06F 3/04883* (2013.01); *G06F 2203/04803* (2013.01)

(58) Field of Classification Search
None
See application file for complete search history.

(56) References Cited

U.S. PATENT DOCUMENTS

| | | | | |
|---|---|---|---|---|
| 5,745,715 A * | 4/1998 | Pickover | ............... | G06F 3/0481 715/811 |
| 8,217,904 B2 * | 7/2012 | Kim | .............................. | 345/173 |
| 8,332,748 B1 * | 12/2012 | Karam | .......................... | 715/246 |
| 2005/0210112 A1 * | 9/2005 | Clement et al. | ............... | 709/206 |
| 2006/0123346 A1 * | 6/2006 | Totman et al. | ................. | 715/748 |
| 2006/0123347 A1 * | 6/2006 | Hewitt et al. | .................. | 715/748 |
| 2006/0187204 A1 * | 8/2006 | Yi et al. | ......................... | 345/158 |
| 2006/0218503 A1 * | 9/2006 | Matthews et al. | ............. | 715/779 |
| 2006/0265668 A1 * | 11/2006 | Rainisto | ......................... | 715/816 |
| 2007/0044039 A1 * | 2/2007 | Amadio et al. | ............... | 715/847 |
| 2007/0234226 A1 * | 10/2007 | Szeto | ............................. | 715/769 |
| 2007/0277100 A1 * | 11/2007 | Sheha et al. | ................... | 715/531 |
| 2008/0195961 A1 * | 8/2008 | Bae et al. | ....................... | 715/769 |
| 2008/0259039 A1 * | 10/2008 | Kocienda | .............. | G06F 3/0238 345/173 |
| 2009/0259959 A1 * | 10/2009 | Grotjohn et al. | .............. | 715/769 |
| 2009/0295737 A1 * | 12/2009 | Goldsmith | .............. | G06F 3/018 345/169 |
| 2010/0105370 A1 * | 4/2010 | Kruzeniski et al. | ......... | 455/414.3 |

(Continued)

FOREIGN PATENT DOCUMENTS

JP 2009-59264 A 3/2006
JP 2007200243 A 8/2007

(Continued)

OTHER PUBLICATIONS

Office Action in JP Application No. JP2012-179418, mailed Apr. 26, 2016, for which an explanation of relevance is attached.

(Continued)

*Primary Examiner* — Stella E Higgs
(74) *Attorney, Agent, or Firm* — Hauptman Ham, LLP

(57) ABSTRACT

According to an aspect, a mobile electronic device includes: a display unit, an operating unit, and a control unit. The display unit for displays a character input screen including a part of a plurality of soft key objects each associated with a process in a line. The operating unit receives input of an operation. Upon detecting a changing operation through the operating unit, the control unit changes arrangement of the soft key objects such that at least one of the soft key objects that has been displayed is not displayed and at least one of the soft key objects that has not been displayed is displayed.

15 Claims, 7 Drawing Sheets

(56) References Cited

U.S. PATENT DOCUMENTS

| | | | |
|---|---|---|---|
| 2010/0123724 A1* | 5/2010 | Moore | G06F 3/04817 345/473 |
| 2010/0211915 A1* | 8/2010 | Sawai | 715/830 |
| 2010/0235759 A1* | 9/2010 | Kang et al. | 715/752 |
| 2010/0262928 A1* | 10/2010 | Abbott | 715/769 |
| 2011/0107234 A1* | 5/2011 | Lee | G06F 17/30067 715/748 |
| 2011/0246944 A1* | 10/2011 | Byrne et al. | 715/835 |
| 2011/0252350 A1* | 10/2011 | Chaudhri | 715/769 |
| 2013/0021287 A1* | 1/2013 | Endo et al. | 345/173 |
| 2015/0074550 A1 | 3/2015 | Takeuchi | |

FOREIGN PATENT DOCUMENTS

| | | |
|---|---|---|
| JP | 2010-506302 A | 2/2010 |
| JP | 2010039772 A | 2/2010 |
| WO | 2008/042745 A2 | 4/2008 |

OTHER PUBLICATIONS

Smart Guide Editorial Department, "Smart Guide for Optimus bright L-07C", Jun. 17, 2011, First Edition, pp. 8-9, 32, 56 and 79, Mainichi Communications Inc.

Office Action in JP Application No. JP2012-179418, mailed Jul. 5, 2016, for which an explanation of relevance is attached.

* cited by examiner

FIG.5
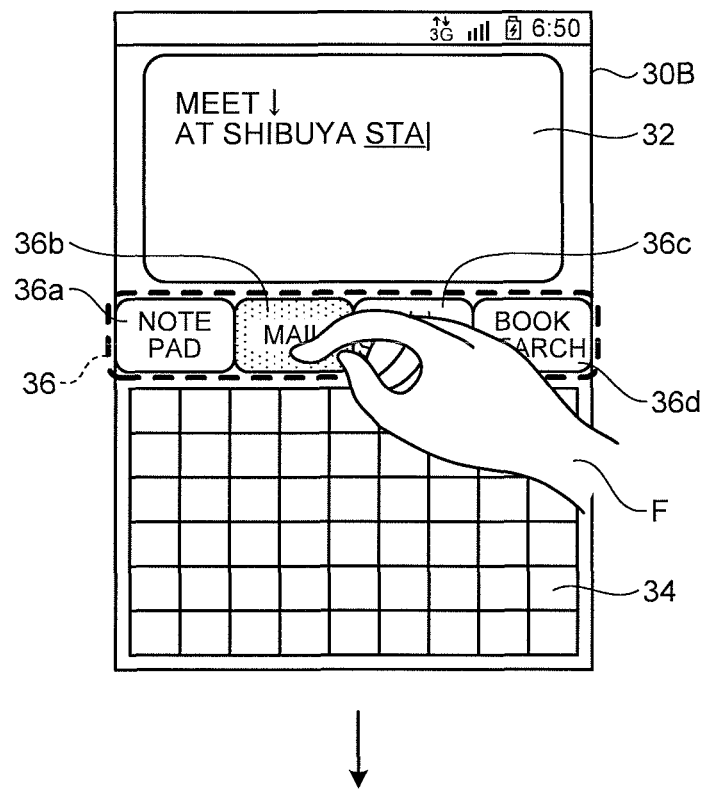
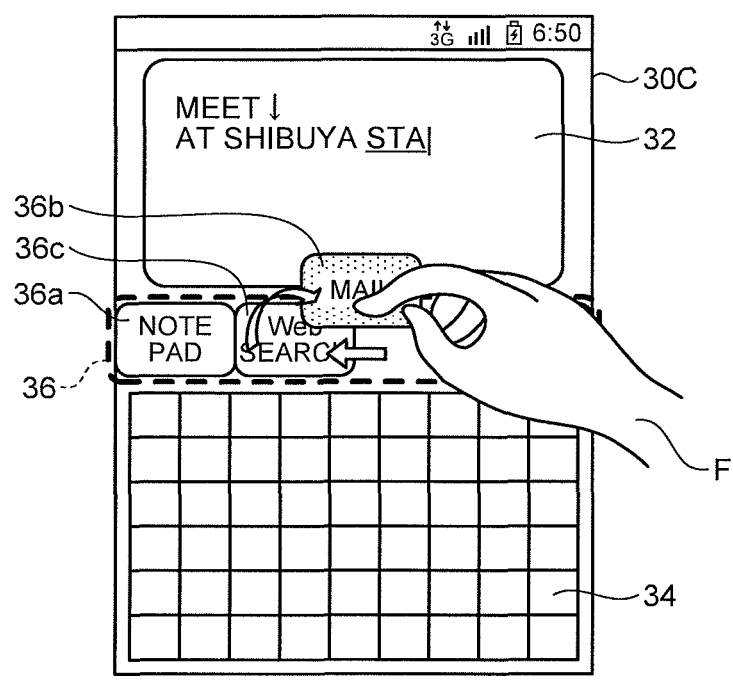

MOBILE ELECTRONIC DEVICE, CONTROL METHOD, AND STORAGE MEDIUM STORING CONTROL PROGRAM

CROSS-REFERENCE TO RELATED APPLICATIONS

This application claims priority from Japanese Application No. 2011-179258, filed on Aug. 18, 2011, the content of which is incorporated by reference herein in its entirety.

BACKGROUND

1. Technical Field

The present disclosure relates to a mobile electronic device, a control method, and a storage medium storing a control program.

2. Description of the Related Art

In recent years, a touch panel device such as a smartphone has become common (refer to JP-A-2010-39772).

The touch panel device displays a character input screen to realize a character input function. The character input screen is normally a screen that is displayed in a state where a predetermined application such as mail has been executed, i.e., a screen displayed in a state where a target into which characters are input has been determined.

Hence, considering the users' demand for character input before executing a predetermined application, there has, in recent years, been a technology that enables the user to input characters first on a character input screen and then select an application to be associated with the characters (refer to JP-A-2007-200243).

However, in the mobile electronic device of the above-mentioned technology (such as JP-A-2007-200243), it is necessary to transit to a selection screen for selecting an application to be associated and select a desired application from an application list displayed on the selection screen after characters are input on the character input screen.

Such a transition may bother the user. For the foregoing reasons, there is a need for a mobile electronic device, a control method, and a control program that allow the user to select a variety of applications be executed while a character input screen is displayed.

SUMMARY

According to an aspect, a mobile electronic device includes: a display unit, an operating unit, and a control unit. The display unit for displays a character input screen including a part of a plurality of soft key objects each associated with a process in a line. The operating unit receives input of an operation. Upon detecting a changing operation through the operating unit, the control unit changes arrangement of the soft key objects such that at least one of the soft key objects that has been displayed is not displayed and at least one of the soft key objects that has not been displayed is displayed.

According to another aspect, a control method is executed by a mobile electronic device including a display unit and an operating unit. The control method includes: displaying on a display unit a character input screen including a part of a plurality of soft key objects each associated with a process in a line; detecting an operation through the operation unit; and changing, upon detecting a changing operation at the detecting, arrangement of the soft key objects such that at least one of the soft key objects that has been displayed is not displayed and at least one of the soft key objects that has not been displayed is displayed.

According to another aspect, a non-transitory storage medium stores a control program. When executed by a mobile electronic device including a display unit and an operating unit, the control program causes the mobile electronic device to execute: displaying on a display unit a character input screen including a part of a plurality of soft key objects each associated with a process in a line; detecting an operation through the operation unit; and changing, upon detecting a changing operation at the detecting, arrangement of the soft key objects such that at least one of the soft key objects that has been displayed is not displayed and at least one of the soft key objects that has not been displayed is displayed.

BRIEF DESCRIPTION OF THE DRAWINGS

FIG. 5 is a view illustrating an example of a replacement operation of a soft key object.

DETAILED DESCRIPTION

Exemplary embodiments of the present invention will be explained in detail below with reference to the accompanying drawings. It should be noted that the present invention is not limited by the following explanation. In addition, this disclosure encompasses not only the components specifically described in the explanation below, but also those which would be apparent to persons ordinarily skilled in the art, upon reading this disclosure, as being interchangeable with or equivalent to the specifically described components.

In the following description, a mobile phone is used to explain as an example of the mobile electronic device; however, the present invention is not limited to mobile phones. Therefore, the present invention can be applied to a variety of mobile electronic devices, including but not limited to, personal handyphone systems (PHS), personal digital assistants (PDA), portable navigation units, personal computers (including but not limited to tablet computers, netbooks etc.), media players, portable electronic reading devices, and gaming devices.

Figure 1:
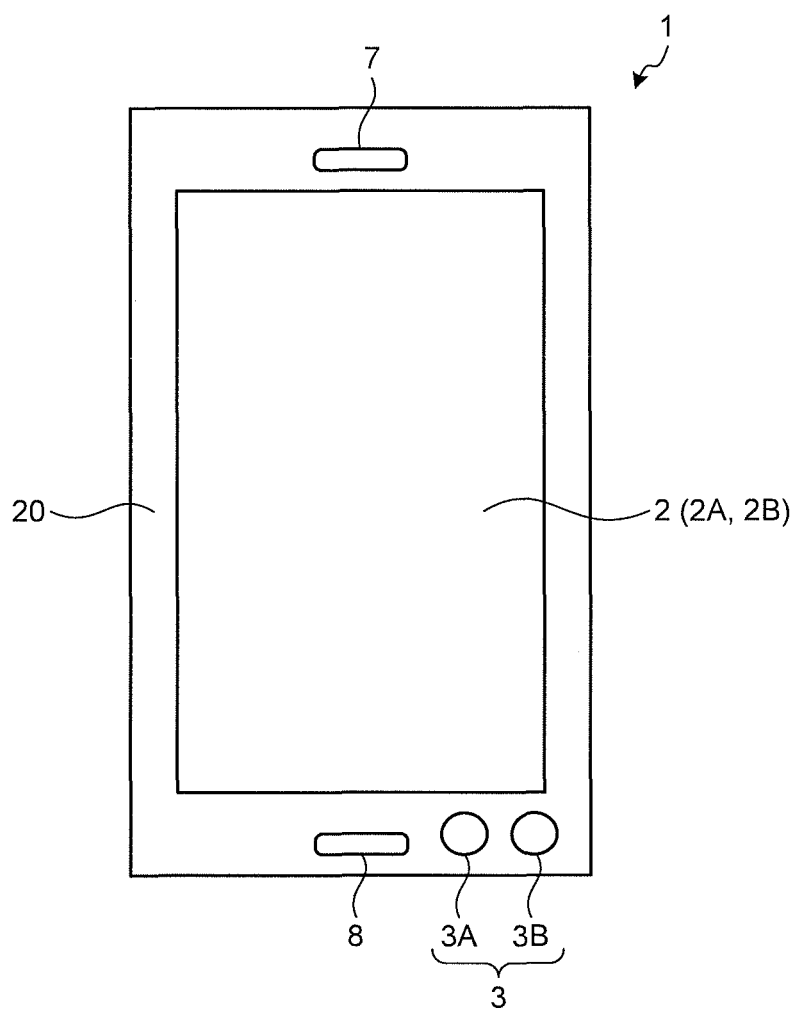
FIG. 1 is a front view of a mobile phone.

First of all, a description will be given of the overall configuration of a mobile phone 1 according to an embodiment with reference to FIG. 1. FIG. 1 is a front view of the mobile phone 1. As illustrated in FIG. 1, the mobile phone 1 includes a housing 20; and a touch panel 2 including a touch sensor 2A and a display unit 2B, an input unit 3, a receiver 7, and a microphone 8 are provided on a surface of the housing 20.

As illustrated in FIG. 1, the touch panel 2, the input unit 3, the receiver 7, and the microphone 8 are arranged on the front side of the housing 20 of the mobile phone 1. The touch panel 2 is arranged in the substantially entire area on the front side of the housing 20. The input unit 3 and the microphone 8 are arranged at one end in a longitudinal direction on the front side of the housing 20. The receiver 7 is arranged at the other end in the longitudinal direction on the front side of the housing 20. In short, the receiver 7 and the microphone 8 are arranged at both ends in the longitudinal direction, respectively. The touch panel 2 is provided on the front side of the housing 20, and displays characters, graphics, images and the like, and detects a contact through which the mobile phone 1 determines various operations performed on the touch panel 2 using a finger, a stylus, a pen or the like (in the description herein below, for the sake of simplicity, it is assumed that the user touches the touch panels with his/her finger(s)). The input unit 3 includes a plurality of buttons, such as a first button 3A and a second button 3B, to which predetermined functions are assigned.

Figure 2:
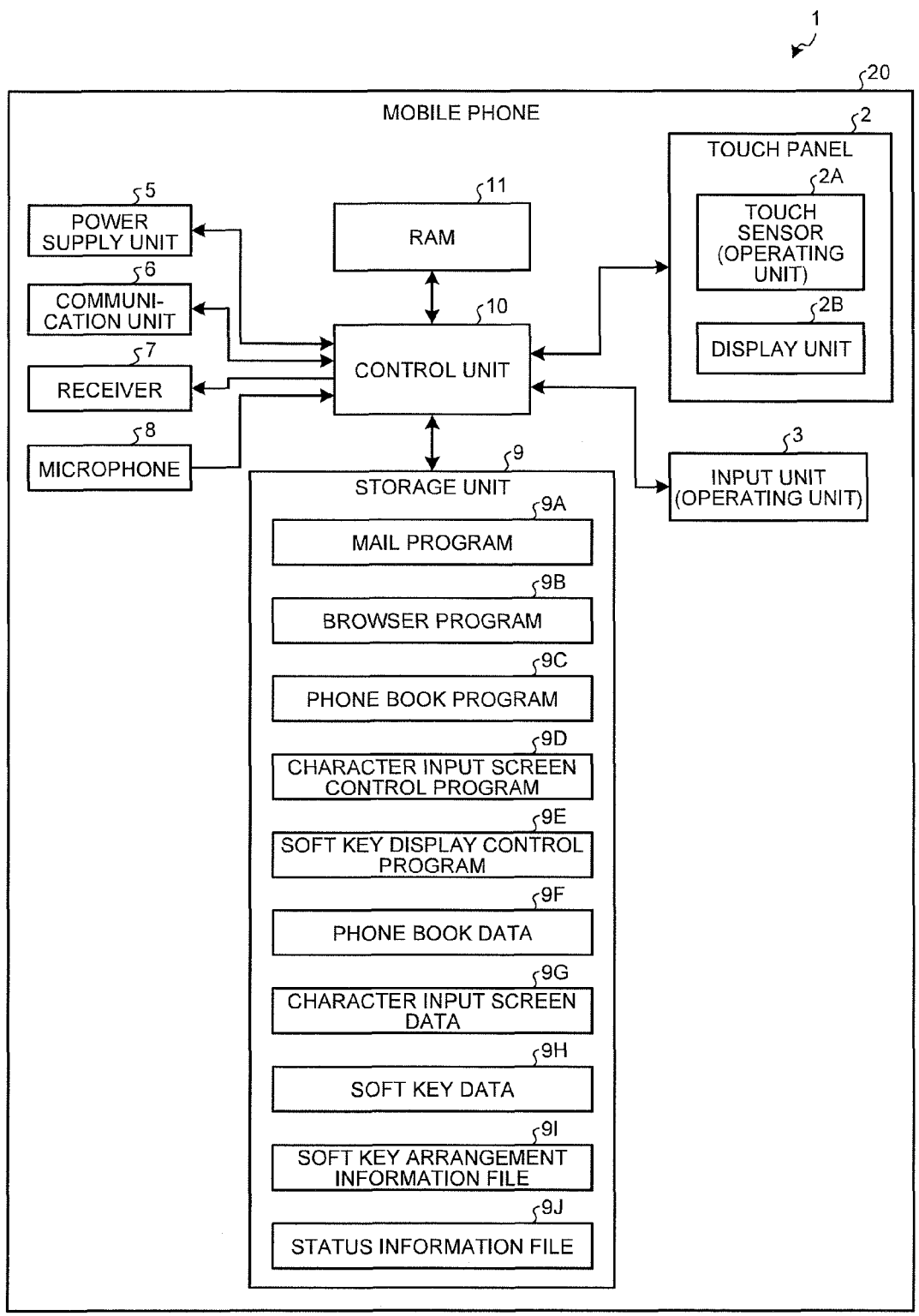
FIG. 2 is a block diagram of the mobile phone.

Then, a description will be given of a functional configuration of the mobile phone 1 with reference to FIG. 2. FIG. 2 is a block diagram of the mobile phone 1. As illustrated in FIG. 2, the mobile phone 1 includes the touch panel 2, the input unit 3, a power supply unit 5, a communication unit 6, the receiver 7, the microphone 8, a storage unit 9, a control unit 10, and a RAM (Random Access Memory) 11. In the embodiment, the touch sensor 2A and the input unit 3 serve as an operating unit.

The touch panel 2 has a first function of displaying various information such as characters, graphics, images and the like. The touch panel 2 has a second function of detecting contact(s) with certain areas such as a displayed object, icon, button, and keyboard area. The touch panel 2 is configured by superimposing the touch sensor 2A and the display unit 2B. The touch sensor 2A and the display unit 2B can share a part of components.

The touch sensor 2A detects contacts(s) on the surface of the touch panel 2, and outputs to the control unit 10 a signal corresponding to the detected contact(s), whereby the control unit 10 determines an operation (gesture) performed for the touch panel 2. In other words, the touch sensor 2A functions as an operating unit that receives the input of an operation. Examples of the system by which the touch sensor 2A detects contacts(s) include, but are not limited to, capacitive system, resistive system, surface acoustic wave (or ultrasound) system, infrared system, electromagnetic resonance system, load detection system, etc. The operations to be detected through the touch sensor 2A include a tap operation, a double tap operation, a long tap operation, a sweep (swipe) operation, and a flick operation.

The tap operation is an operation to bring the finger into contact with the touch panel 2 and immediately move the finger off the touch panel 2. The double tap operation is an operation to repeat twice a movement to bring the finger into contact with the touch panel 2 and immediately move the finger off the touch panel 2. The long tap operation is an operation to bring the finger into contact with the touch panel 2 and move the finger off the touch panel 2 after keeping a state where the finger is in contact with the touch panel 2 for a certain time period. The sweep operation is an operation to move the finger while keeping the finger in contact with the touch panel 2. The sweep operation may be called a drag operation when some object that is being displayed on the touch panel 2 moves in the wake of the operation. The sweep operation may be called a drop operation when some object that is being displayed on the touch panel 2 is released in a position that has moved in the wake of the operation. The flick operation is an operation to bring the finger into contact with the touch panel 2 and afterward move the finger off while moving the finger in one direction at high speed as if sweeping quickly.

In the following explanation, for the sake of simplicity of explanation, the fact that the touch sensor detects the contact(s) and then the control unit determines the type of the gesture as X based on the contact(s) may be simply described as "the mobile phone detects X", "the control unit detects X", "the touch sensor detects X", or "the touch panel detects X".

The display unit 2B is configured of a liquid display panel (LCD), an organic electro-luminescence display (OELD), an inorganic electro-luminescence display (IELD), or the like, and displays characters, graphics, or the like. The display unit 2B displays various information in accordance with a control signal input from the control unit 10.

The input unit 3 accepts the operation of a user through a physical button or the like, and transmits a signal corresponding to the accepted operation to the control unit 10, whereby the control unit 10 determines an operation performed for the input unit 3. In other words, the input unit 3 functions as an operating unit that receives the input of an operation. The power supply unit 5 supplies power obtained from a rechargeable battery or an external power source to the functional units of the mobile phone 1 including the control unit 10.

The communication unit 6 establishes a wireless signal path using a code-division multiple access (CDMA) system, or any other wireless communication protocols, with a base station via a channel allocated by the base station, and performs telephone communication and information communication with the base station. Any other wired or wireless communication or network interfaces, e.g., LAN, Bluetooth, Wi-Fi, NFC (Near Field Communication) may also be included in lieu of or in addition to the communication unit 6. The receiver 7 outputs a sound signal transmitted from the control unit 10 as sound. The microphone 8 converts the sound of the user and the like into a sound signal and transmits the sound signal to the control unit 10.

The storage unit 9 includes one or more non-transitory storage medium, for example, a nonvolatile memory (such as ROM, EPROM, flash card etc.) and/or a storage device (such as magnetic storage device, optical storage device, solid-state storage device etc.), and stores therein programs and data used for processes performed by the control unit 10. The programs stored in the storage unit 9 include a mail program 9A, a browser program 9B, a phone book program 9C, a character input screen control program 9D, and a soft key display control program 9E. The storage unit 9 stores also other programs, such as an operating system program to realize a basic function of the mobile phone 1, and data. These application programs may be downloaded and installed on the mobile phone 1. The storage unit 9 stores, as data, phone book data 9F, character input screen data 9G, and soft key data 9H. In the embodiment, the storage unit 9 further includes a soft key arrangement information file 9I and a status information file 9J. The storage unit 9 may be configured as a combination of a non-transitory portable storage medium such as a memory card and a reader of the storage medium.

The mail program 9A provides a function to realize an email function (mail application). The browser program 9B provides a function to realize a web browsing function (browser application). The phone book program 9C provides a function to realize a phone book function (phone book application). The character input screen control program 9D provides a function to realize a character input function (character input application). The character input screen of the embodiment includes an input character display area for displaying input characters, a soft key display area for displaying a part of a plurality of soft key objects which are arranged in a line and each of which is associated with the execution of a predetermined process, and a keyboard area for inputting characters. In the embodiment, the execution of a certain process includes the execution of a certain application. In the embodiment, the character input screen control program 9D provides functions such as to display input characters in the input character display area on the character input screen based on a character input operation detected in the keyboard area on the character input screen. The soft key display control program 9E provides a function to realize a soft key display function. In the embodiment, the soft key display control program 9E provides a function to display a soft key object in the soft key display area on the character input screen, a function to execute a predetermined process and a predetermined application associated with a soft key object, a function to change the configuration of the soft key objects displayed in the soft key display area, and the like.

In the embodiment, the character input screen is a screen to be displayed when a predetermined trigger action is input by a user, the character input application is executed, and then the detection of character input is started. Examples of the trigger action include, but not limited to, a click operation on the input unit 3 (such as the first button 3A) or a contact operation on a certain icon displayed on a lock screen, an idle screen, or the like. The lock screen is a screen that transits to the idle screen only when a predetermined operation is detected. In other words, the lock screen is a screen to be displayed in a locked state where various functions of the mobile phone 1 cannot be operated before a predetermined operation is input. The idle screen is a screen to be displayed in a state of waiting for an incoming and an outgoing call or in a state of waiting for the execution of an application program (what is also called a home screen or a standby screen). In other words, the idle screen is a screen before the screen is changed to any of operation screens that the control unit 10 displays on the display unit 2B for a variety of applications. The operation screen is a screen to provide the user with the function of an application included in the mobile phone 1. Examples of the function of the application included in the mobile phone 1 include, but not limited to, a communication function with another mobile phone, a mail transmission/reception function, an imaging function by a camera provided with the mobile phone 1, an audio/visual function, a text editing function, etc. For example, the user can preset a favorable image and/or a status display such as clock as a background screen of the idle screen. The background screen is also referred to as a wall paper.

The phone book data 9F include data, such as registered names, telephone numbers, email addresses, that are used when the phone book program 9C is executed. The character input screen data 9G include various character data or image data to be displayed upon executing the character input screen control program 9D. In the embodiment, the character input screen data 9G include character data to be displayed in the input character display area and image data of keyboard objects to be displayed in the keyboard area. The soft key data 9H include various character data or image data to be displayed upon executing the soft key display control program 9E. In the embodiment, the soft key data 9H include character data and image data, which indicate with which application a soft key object is associated.

The soft key arrangement information file 9I is arrangement information storage means that stores arrangement information indicating the arrangement of the soft key objects displayed in the soft key display area on the character input screen. In the embodiment, the arrangement information is positional information that indicates the arrangement of the soft key objects displayed in the soft key display area. The control unit 10 stores in the soft key arrangement information file 9I the positional data of the soft key objects displayed in the soft key display area when an application corresponding to a soft key object selected by the user is executed. The status information file 9J is status information storage means that stores the status information of the applications included in the mobile phone 1. In the embodiment, the status information is list data that indicate the statuses of the applications such as the addition or deletion. The control unit 10 updates the status information stored in the status information file 9J whenever the applications are added, deleted, or the like.

The control unit 10 is, for example, a CPU (Central Processing Unit), and integrally controls the operation of the mobile phone 1 to realize various functions. Specifically, the control unit 10 executes an instruction included in a program stored in the storage unit 9 while referring to data stored in the storage unit 9 or data loaded into the RAM 11 as necessary, and controls the display unit 2B, the communication unit 6, or the like to realize various functions. The program to be executed by and the data to be referred to by the control unit 10 may be downloaded from a server apparatus through communication by the communication unit 6.

The control unit 10 executes, for example, the mail program 9A to realize the email function. The control unit 10 executes the browser program 9B to realize the web browsing function. The control unit 10 executes the phone book program 9C to realize the phone book function. The control unit 10 executes the character input screen control program 9D to realize the character input function (character input application). In the embodiment, the control unit 10 executes the character input screen control program 9D and thereby realizes functions such as to display an input character in the input character display area on the character input screen based on a character input operation detected in the keyboard area on the character input screen. The control unit 10 executes the soft key display control program 9E to realize the soft key display function. In the embodiment, the control unit 10 executes the soft key display control program 9E and thereby provides a function to display a soft key object in the soft key display area on the character input screen, a function to execute a predetermined process and a predetermined application, which are associated with a soft key object, a function to change the configuration of soft key objects displayed in the soft key display area, and the like. It is assumed that the control unit 10 can execute a plurality of programs concurrently by a multi-task function provided by the operating system program. In the embodiment, the control unit 10 executes at least the character input screen control program 9D and the soft key display control program 9E concurrently and thereby executes processes on the input character display area, the soft key display area and the keyboard area on the character input screen.

The RAM 11 is used as a storage area that temporarily stores an instruction of a program to be executed by the control unit 10, data to be referred to by the control unit 10, a computation result of the control unit 10, and the like.

Then, a description will be given of an example of control to be executed by the control unit 10 of the mobile phone 1 with reference to FIGS. 3 to 8.

Figure 3:
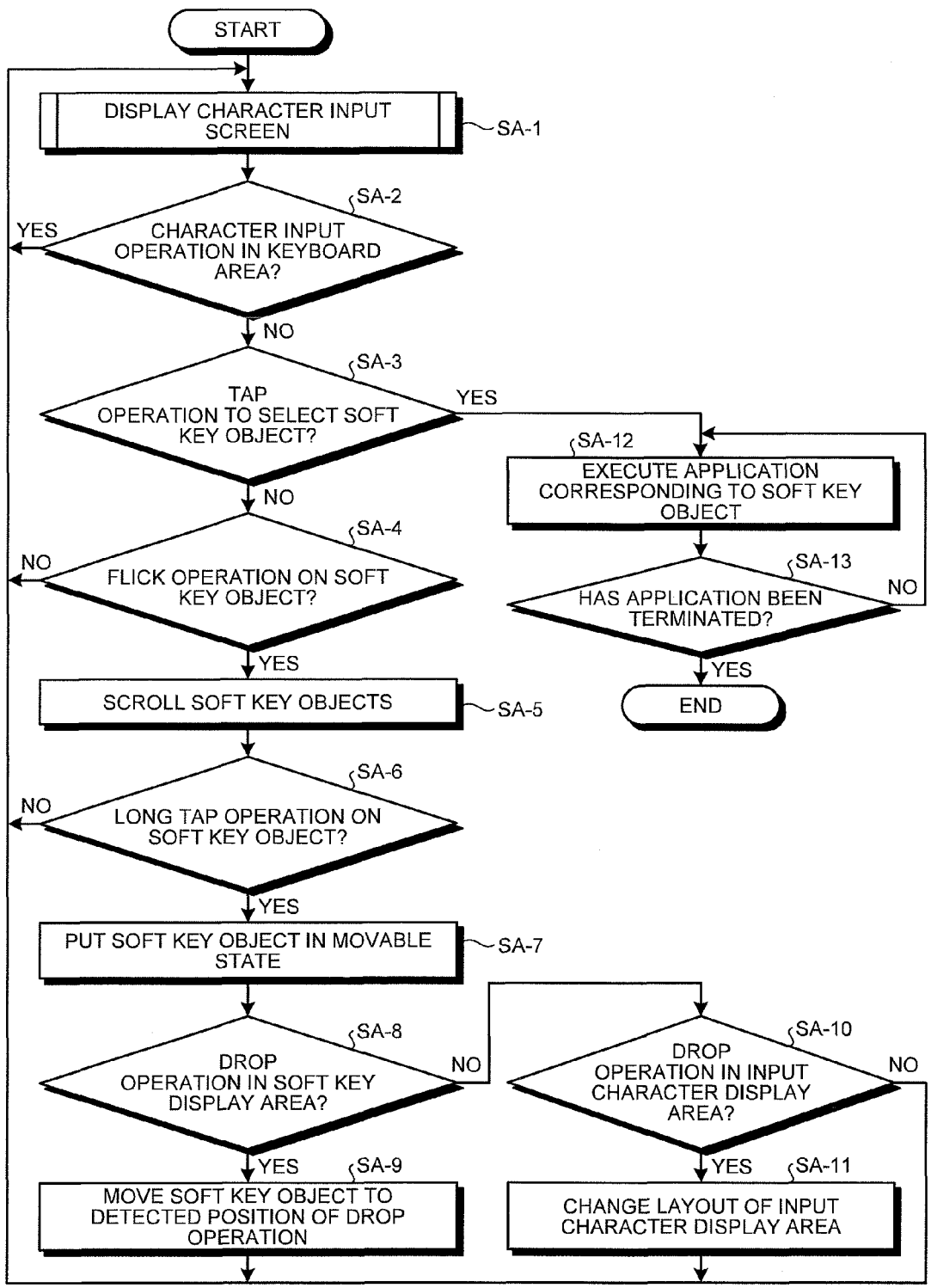
FIG. 3 is a flowchart illustrating an example of a basis process of the mobile phone.

First of all, a description will be given of the basic process of the mobile phone 1 according to the embodiment in line with the flowchart of FIG. 3 appropriately referring to FIGS. 4 to 6. FIG. 3 is a flowchart illustrating an example of the basic process of the mobile phone 1. The processing procedure illustrated in FIG. 3 is repeatedly executed based on the functions provided by the character input screen control program 9D and the soft key display control program 9E. The processes illustrated in FIG. 3 are executed when a predetermined trigger action is previously input by the user from the lock screen, the idle screen, or the like, and the control unit 10 executes the character input application.

As illustrated in FIG. 3, when the character input application is executed by the operation of the user, the control unit 10 displays the character input screen on the display unit 2B (Step SA-1). At this point, the control unit 10 arranges a plurality of soft key objects each associated with the execution of a predetermined process (including the execution of a predetermined application) in a line and displays a part of the plurality of soft key objects arranged in a line in the band-shaped soft key display area on the character input screen.

A description will be given of an example of the character input screen to be displayed on the display unit 2B with reference to FIG. 4. FIG. 4 is a view illustrating an example of the character input screen according to the embodiment. A character input screen 30A illustrated in FIG. 4 is in a state where a part of characters have been input.

Figure 4:
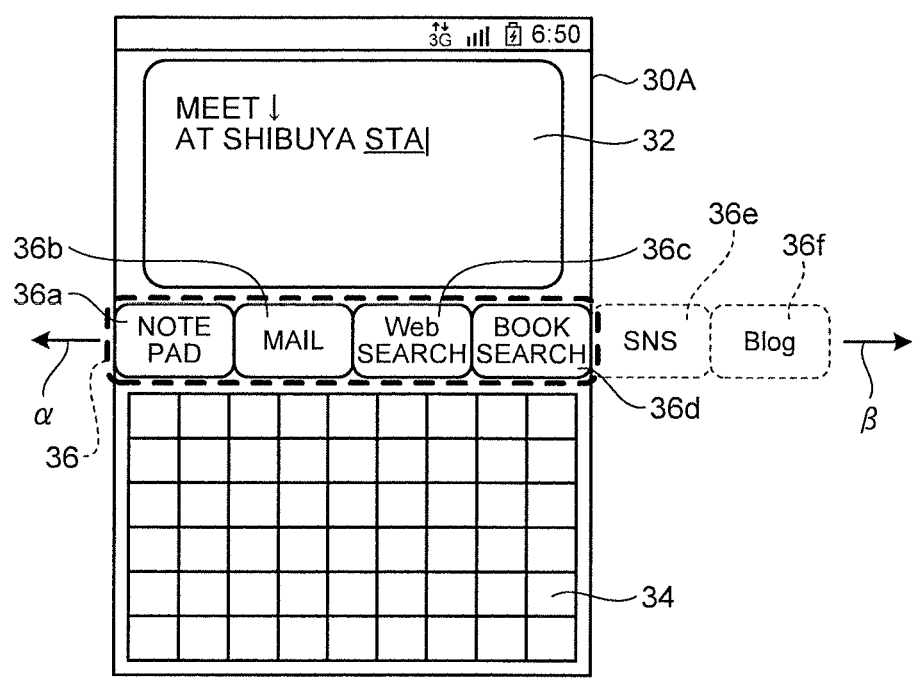
FIG. 4 is a view illustrating an example of a character input screen according to the embodiment.

As illustrated in FIG. 4, the character input screen 30A includes an input character display area 32 for checking an input character string over a substantially entire area of the upper half of the screen, a keyboard area 34 for inputting a character string over a substantially entire area of the lower half of the screen, and a soft key display area 36 in the center of the screen. The soft key display area 36 is an area for displaying a part of the plurality of soft key objects 36a to 36f which are arranged in a line and each of which is associated with the execution of a predetermined process. A character string input by a contact operation with the keyboard objects in the keyboard area 34 is being displayed in the input character display area 32. The character string that is being displayed in the input character display area 32 is "meet ↓ at Shibuya Sta|." The downward arrow symbol "↓" represents a line feed, and a vertical bar symbol "|" represents a cursor. The keyboard objects in the keyboard area 34 can be operated by the tap operation, and the like.

In the embodiment, the soft key display area 36 is a band-shaped area extending in a left-and-right direction as illustrated in a dotted line portion between the input character display area 32 and the keyboard area 34. The plurality of soft key objects 36a, 36b, 36c and 36d are displayed in the soft key display area 36. In FIG. 4, the soft key objects 36e and 36f are arranged, but not actually displayed in the soft key display area 36. The user inputs the operation (flick operation) to move the soft key object to display in the soft key display area 36 and scrolls through the soft key objects displayed in the soft key display area 36; accordingly, the soft key objects 36e and 36f can be displayed. The mobile phone 1 in the embodiment displays the hidden soft key objects 36e and 36f in the soft key display area 36 when the input of a flick operation in an "α" direction (on a first end side) or a "β" direction (on a second end side), or the like is detected in the soft key display area 36 of the character input screen 30A. In short, in the embodiment, the soft key objects 36a to 36f are arranged in a line in the order of the soft key objects 36a, 36b, 36c, 36d, 36e, and 36f, and are scrolled through to be displayed in the soft key display area 36 when the user inputs a predetermined move operation. The soft key objects 36a and 36f out of the soft key objects 36a to 36f may be arranged in a manner of being virtually adjacent. In short, the soft key objects 36a to 36f may be arranged with a rule of cyclic display in the soft key display area 36. The operation of the soft key display area 36 will be described later.

In the embodiment, the soft key objects 36a to 36f to be displayed in the soft key display area 36 are each associated with an application that can be associated with the character input function. In short, in the embodiment, the applications associated respectively with the soft key objects 36a to 36f are applications that can use a character string displayed in the input character display area 32 on the character input screen 30A. The soft key object 36a is an image including a character string "Note Pad," and is a shortcut for executing a text editor. The soft key object 36b is an image including a character string "Mail," and is a shortcut for executing a mail application. The soft key object 36c is an image including a character string "Web Search," and is a shortcut for executing a browser application that displays a predetermined search engine. The soft key object 36d is an image including a character string "Book Search," and is a shortcut for executing a phone book application. The soft key object 36e is an image including a character string "SNS," and is a shortcut for executing a browser application to display a predetermined social network service site. The soft key object 36f is an image including a character string "Blog," and is a shortcut for executing a browser application to display a predetermined blog site. In the embodiment, the soft key objects 36a to 36f can be operated by a tap operation, a long tap operation, a sweep operation, a flick operation, and the like. The soft key object may include an image in accordance with an application corresponding to the soft key object. For example, a soft key object may include an icon image corresponding to any of various mail applications.

Return to FIG. 3 to continue the description of the processing by the control unit 10. The control unit 10 determines whether or not the input of a character input operation has been detected in the keyboard area on the character input screen (Step SA-2). The character input operation includes a tap operation on a keyboard object in the keyboard area.

When determining at Step SA-2 that the input of a character input operation has been detected (Step SA-2: Yes), the control unit 10 proceeds to the process of Step SA-1, and displays the characters input by the character input operation in the input character display area.

On the other hand, when determining at Step SA-2 that the input of a character input operation has not been detected (Step SA-2: No), the control unit 10 determines whether or not the input of an operation (tap operation) to select and execute a soft key object displayed has been detected in the soft key display area (Step SA-3).

When determining at Step SA-3 that the input of an operation (tap operation) to select and execute a soft key object has not been detected (Step SA-3: No), the control unit 10 determines whether or not the input of an operation to change the display in the soft key display area has been detected (Step SA-4). In other words, the control unit 10 determines whether or not the input of a flick operation has been detected on the band-shaped soft key display area.

When determining at Step SA-4 that the input of a flick operation has been detected (Step SA-4: Yes), the control unit 10 moves the relative positions of the plurality of soft key objects arranged in a line in the soft key display area, displays in the soft key display area at least one of the soft key objects that have not been displayed in the soft key display area, and deletes at least one of the soft key objects that have been displayed in the soft key display area (Step SA-5). Specifically, the control 10 deletes at least one of the soft key objects located at the first end in the soft key display area in a move direction of the flick operation, and displays at least one of the soft key objects that have not been displayed in the soft key display area, at the second end in the soft key display area, which is on a side opposite to the first end. The first end is an end on a side closer to an end point of the flick operation than a start point thereof in the move direction of the flick operation, and the second end is an end on a side closer to the start point of the flick operation than the end point thereof in the move direction of the flick operation. On the other hand, when determining at Step SA-4 that the input of a flick operation has not been detected (Step SA-4: No), the control unit 10 proceeds to the process of Step SA-1.

After scrolling to display the soft key object at Step SA-5, the control unit 10 determines whether or not the input of an operation (long tap operation) to maintain the selection of the soft key object displayed in the soft key display area has been detected (Step SA-6).

When determining at Step SA-6 that the input of a long tap operation has been detected (Step SA-6: Yes), the control unit 10 puts the soft key object in a movable state (Step SA-7). On the other hand, when determining at Step SA-6 that the input of a long tap operation has not been detected (Step SA-6: No), the control unit 10 proceeds the process of Step SA-1.

After putting the soft key object in a movable state at Step SA-7, the control unit 10 determines whether or not the input of an operation (drop operation) to move and release the soft key object to and in the soft key display area has been detected (Step SA-8).

When determining at Step SA-8 that the input of a drop operation has been detected in the soft key display area (Step SA-8: Yes), the control unit 10 changes the arrangement of the plurality of soft key objects arranged in a line in a manner of displaying the soft key object in the movable state at the detected position of the drop operation (Step SA-9). Subsequently, the control unit 10 proceeds to the process of Step SA-1.

A description will be given of an example of the character input screen that has been changed by the operation of replacing the soft key object, the operation being performed at Steps SA-6 to SA-9, with reference to FIG. 5. FIG. 5 is a view illustrating an example of a replacement operation of a soft key object.

As illustrated in FIG. 5, a character input screen 30B on the upper side represents a state where the soft key object 36b has been selected by a long tap operation by a finger F of the user. A character input screen 30C on the lower side represents a state where the soft key object 36b that has been brought to a movable state by the long tap operation is moved to between the soft key objects 36c and 36d by a drag-and-drop operation. The character input screen 30C is similar to the character input screen 30A of FIG. 4 other than the display position of the soft key object 36b.

Return to FIG. 3, and continue the description of the processing by the control unit 10 from the process of Step SA-8. When determining at Step SA-8 that the input of a drop operation has not been detected in the soft key display area (Step SA-8: No), the control unit 10 determines whether or not a drop operation that moves and releases the soft key object to and in the input character display area has been detected (Step SA-10).

When determining at Step SA-10 that the input of a drop operation has been detected in the input character display area (Step SA-10: Yes), the control unit 10 changes the layout of the input character display area in accordance with an application corresponding to the soft key object (Step SA-11). Subsequently, the control unit 10 proceeds to the process of Step SA-1. When determining at Step SA-10 that the input of a drop operation has not been detected in the input character display area (Step SA-10: No), the control unit 10 proceeds to the process of Step SA-1 similarly. In this case, it is assumed that the soft key object returns to the previous position.

A description will be given of an example of the character input screen that is changed by the operation of changing the layout of the input character display area, the operation being performed at Step SA-10 to SA-11 with reference to FIG. 6. FIG. 6 is a view illustrating an example of the operation of changing the layout of the input character display area.

Figure 6:
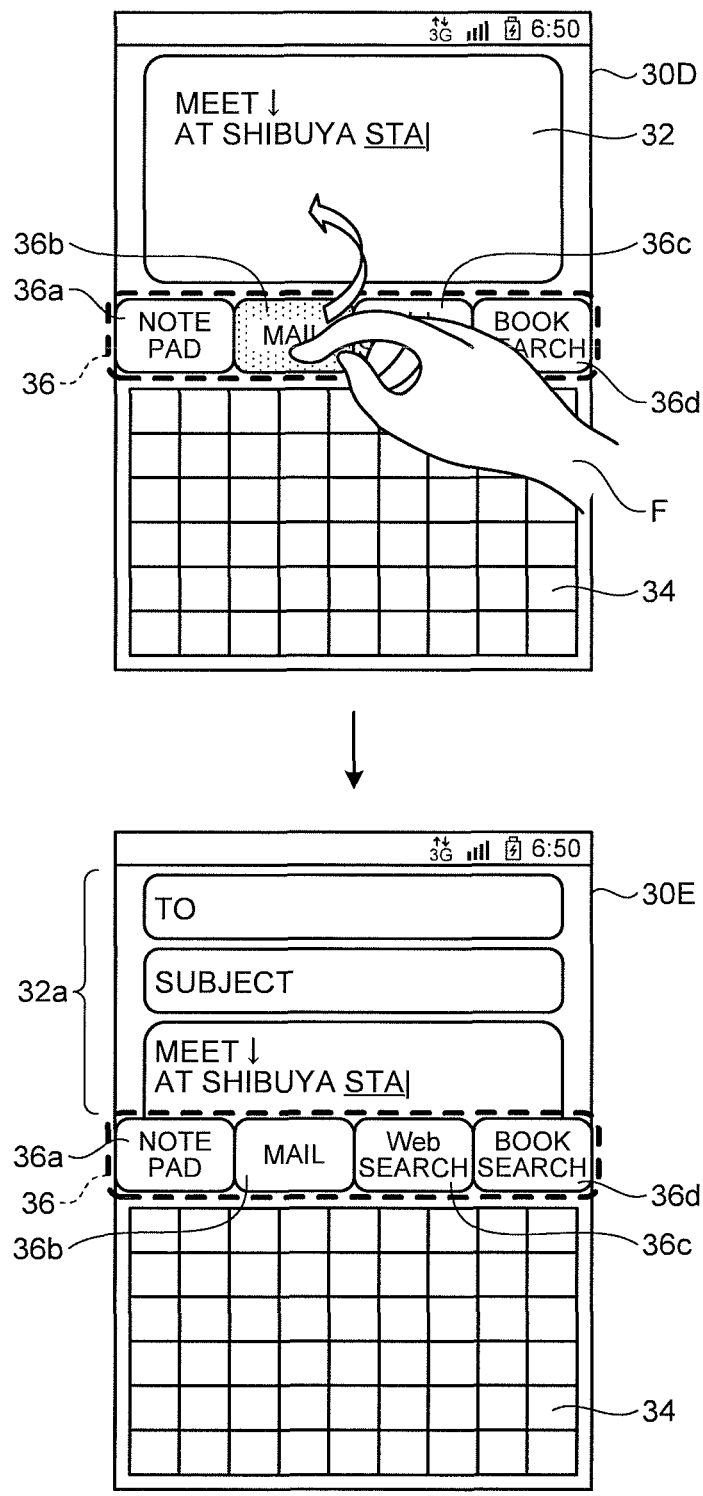
FIG. 6 is a view illustrating an example of a layout change operation of an input character display area.

As illustrated in FIG. 6, a character input screen 30D on the upper side represents a state where the soft key object 36b has been selected by a long tap operation by the finger F of the user to be moved to the input character display area 32 by a drag-and-drop operation. A character input screen 30E on the lower side represents a state where an input character display area 32a has been changed to the layout in accordance with the mail application associated with the soft key object 36b. The input character display area 32a includes a destination input field for inputting the destination in the upper part of the area, a subject input field for inputting the subject in the center of the area, and a main body input field for inputting the main body in the lower part of the area. The main body input field displays the character string that has been displayed in the input character display area 32 of the character input screen 30D. The character input screen 30E is similar to the character input screen 30A of FIG. 4 other than the input character display area 32a.

Return to FIG. 3, and continue the description of the processing by the control unit 10 from the process of Step SA-3. When determining at Step SA-3 that the input of an operation (tap operation) to select and execute a soft key object displayed has been detected in the soft key display area (Step SA-3: Yes), the control unit 10 executes an application corresponding to the soft key object (Step SA-12). The execution of an application indicates switching the display from a character input screen displayed on the display unit 2B to an operation screen to operate an application associated with a soft key object. When a character string is displayed in the input character display area on the character input screen, the control unit 10 executes an application by use of the character string.

For example, when the soft key object 36b illustrated in FIG. 4 is selected, the control unit 10 executes the mail application and executes the processes of composing a mail by use of the character string displayed in the input character display area 32. When the soft key object 36c illustrated in FIG. 4 is selected, the control unit 10 executes the browser application and executes the process of searching for information corresponding to the character string displayed in the input character display area 32. When the soft key object 36d illustrated in FIG. 4 is selected, the control unit 10 executes the phone book application and executes the process of searching the phone book data 9F for information corresponding to the character string displayed in the input character display area 32.

After executing the application corresponding to the soft key object at Step SA-12, the control unit 10 determines whether or not the execution of the application has been terminated (Step SA-13). The control unit 10 may determine whether or not the input of a termination operation has been detected to determine whether or not the execution of the application has been terminated. Examples of the termination operation include, but not limited to, a click operation on the input unit 3 (such as the second button 3B) and a contact operation on a predetermined icon (such as an end button object) displayed on the character input screen.

When not determining at Step SA-13 that the execution of the application has been terminated (Step SA-13: No), the control unit 10 proceeds to the process of Step SA-12 and repeats the process until determining at Step SA-13 that the execution of the application has been terminated.

On the other hand, when determining at Step SA-13 that the execution of the application has been terminated (Step SA-13: Yes), the control unit 10 terminates the process of the character input application afterward. The control unit 10 then executes various processes included in the mobile phone 1. Specifically, the control unit 10 executes a process (for example, the execution of an application corresponding to an object displayed on the home screen, call, and imaging) corresponding to an operation detected through the touch sensor 2A or the input unit 3. When determining at Step SA-13 that the execution of the application has been terminated, the control unit 10 may proceed to the process of Step SA-1 to display the character input screen without terminating the process of the character input application.

In this manner, according to the embodiment, the user can select, scroll through and rearrange soft key objects arranged in the band-shaped soft key display area on the character input screen by a contact operation, a flick operation, and a long tap operation, respectively. In other words, according to the embodiment, in addition to being possible to display the soft key objects to be associated with applications in a band-shape list form in the center of the screen, it is possible to select the soft key object by a short press and replace the soft key object by a long press. Consequently, according to the embodiment, the user can intuitionally and sufficiently select an application that can be associated with the character input function on the character input screen without reducing an area used for the character input function (the input character display area and the keyboard area).

According to the embodiment, a soft key object is dropped in the input character display area; accordingly, it is possible to execute an application corresponding to the soft key object and customize only the input character display area to the layout in accordance with the application. For example, a soft key object associated with the mail application is dropped in the input character display area; accordingly, it is possible to change the input character display area to the layout including the items of the destination, the subject and the main body. In short, according to the embodiment, it is possible to customize the layout of the input character display area on the character input screen in accordance with an application corresponding to a soft key object.

In the embodiment, as illustrated in FIGS. 4 to 6, the soft key display area is arranged in the band-shaped area extending in the left-and-right direction between the input character display area and the keyboard area; however, the soft key display area may be arranged in a band-shaped area extending in an up-and-down direction on the left or right side of the screen when the character input screen is horizontally oriented. In this case, the soft key objects to be displayed in the soft key display area may have a vertically oriented shape.

In the embodiment, a soft key object may be a shortcut for executing a predetermined application, or a shortcut for executing a predetermined process. For example, a soft key object may be a shortcut for executing a predetermined process in which a mail application is executed and then the phone book data 9F is invoked to transmit a mail to a predetermined destination. A soft key object may be a shortcut for executing the predetermined process of transmitting a mail further including a predetermined message that is registered in advance. In the embodiment, when the input of a double tap operation or the like on a soft key object is detected through the operating unit, the control unit 10 may display the sub menu of an application corresponding to the soft key object as a pull-down menu.

The control unit 10 of the mobile phone 1 may change the configuration of soft key objects to be displayed in the soft key display area based on a character displayed in the input character display area. For example, when a line feed character is included in the input character display area, the control unit 10 may delete from the soft key display area a soft key object associated with a browser application to display a short text post site such as twitter. In addition, the control unit 10 may change a soft key object to be displayed in the soft key display area in accordance with the attribute of a character, the number of characters, and the like, the character(s) being displayed in the input character display area. For example, when the number of characters in the input character display area reaches a predetermined threshold value, the control unit 10 may delete a soft key object associated with a short mail service (SMS) from the soft key display area.

In this manner, according to the embodiment, it is possible to automatically change the configuration of soft key objects to be displayed in the soft key display area in accordance with the attribute of a character or the number of characters, the character(s) being input, upon the display of the character input screen. For example, when a line feed is input on the character input screen, it is possible to delete the soft key object associated with the browser application to display a short text post site such as twitter. In short, according to the embodiment, it is possible to automatically adjust the configuration of soft key objects in accordance with the character input state. Therefore, the control unit 10 of the mobile phone 1 changes the configuration of soft key objects to display based on an input character to display only available soft key objects. Consequently, it is possible to prevent the user from inputting an unexecutable operation, and also the user can intuitionally understand an application or function that can be used with respect to the input character.

Figure 7:
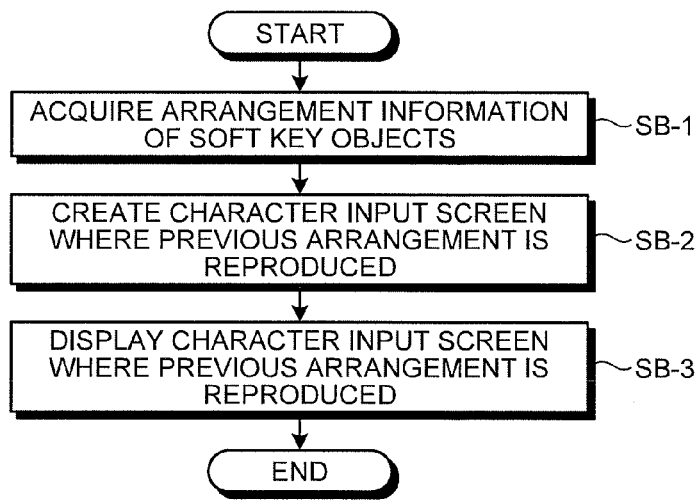
FIG. 7 is a flowchart illustrating an example of a character input screen display process.

Then, a description will be given of an example of a character input screen display process to be executed by the mobile phone 1 according to the embodiment with reference to FIG. 7. FIG. 7 is a flowchart illustrating an example of the character input screen display process. The flowchart of FIG. 7 is for explaining in detail the character input screen display process to be executed by the control unit 10 at Step SA-1 of FIG. 3. The processing procedure illustrated in FIG. 7 is executed based on the functions provided by the character input screen control program 9D and the soft key display control program 9E.

As illustrated in FIG. 7, the control unit 10 of the mobile phone 1 acquires the arrangement information that indicates the arrangement of soft key objects to be displayed in the soft key display area, from the soft key arrangement information file 9I of the storage unit 9 (Step SB-1). In the embodiment, the arrangement information is position data that indicate the arrangement of soft key objects that were displayed in the soft key display area. In the embodiment, it is assumed that at Step SA-12 of FIG. 3, the control unit 10 stores the position data of the soft key objects displayed in the soft key display area upon the execution of an application associated with a soft key object selected by the user in the soft key arrangement information file 9I.

The control unit 10 then creates a character input screen where the arrangement of soft key objects that were displayed in the soft key display area immediately before the execution of the application (corresponding to Step SA-12 of FIG. 3) has been reproduced based on the arrangement information acquired from the soft key arrangement information file 9I at Step SB-1 (Step SB-2).

The control unit 10 then displays on the display unit 2B the character input screen where the arrangement has been reproduced at Step SB-2 (Step SB-3). The character input screen display process is subsequently terminated to proceed to the process of Step SA-2 of FIG. 3.

In this manner, according to the embodiment, when moving from the character input screen to another screen and afterward displaying the character input screen, the control unit 10 of the mobile phone 1 can display on the display unit 2B the character input screen where the arrangement of the soft key objects that were displayed in the soft key display area immediately before the execution of a predetermined process and a predetermined application has been reproduced based on the arrangement information stored in the soft key arrangement information file 9I of the storage unit 9. Consequently, the user can select from the soft key objects that were displayed at the previous use when selecting a soft key object again on the character input screen; accordingly, the convenience of the character input screen is further improved.

Figure 8:
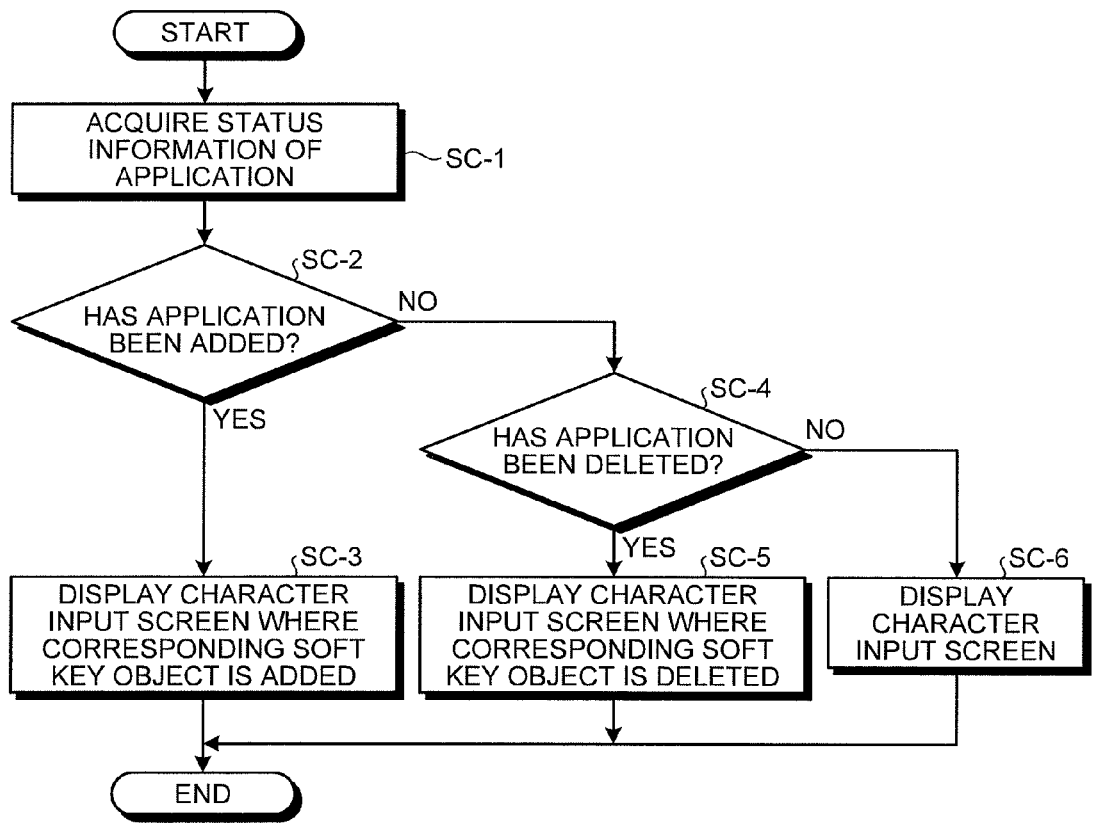
FIG. 8 is a flowchart illustrating an example of another processing of the character input screen display process.

Lastly, a description will be given of another example of the character input screen display process to be executed by the mobile phone 1 according to the embodiment with reference to FIG. 8. FIG. 8 is a flowchart illustrating another example of the character input screen display process. The flowchart of FIG. 8 is for explaining in detail another example of the character input screen display process to be executed by the control unit 10 at Step SA-1 of FIG. 3. The processing procedure illustrated in FIG. 8 is executed based on the functions provided by the character input screen control program 9D and the soft key display control program 9E.

As illustrated in FIG. 8, the control unit 10 of the mobile phone 1 acquires the status information of the applications included in the mobile phone 1, from the status information file 9J in the storage unit 9 (Step SC-1). In the embodiment, the status information is list data that indicate statuses such as the addition or deletion of the applications. In the embodiment, the control unit 10 updates the status information stored in the status information file 9J whenever the applications are added, deleted, or the like.

The control unit 10 then performs the processes of changing the configuration of soft key objects to be displayed in the soft key display area, the processes being described in the following Steps SC-2 to SC-5, based on the status information acquired from the status information file 9J at Step SC-1.

Specifically, the control unit 10 determines whether or not an application has been added based on the status information acquired from the status information file 9J at Step SC-1 (Step SC-2).

When determining at Step SC-2 that an application has been added (Step SC-2: Yes), the control unit 10 displays a soft key object corresponding to the application in the soft key display area (Step SC-3). The control unit 10 may display soft key objects in the soft key display area in the order of addition from the soft key object corresponding to the newly added application. At this point, the control unit 10 may include an icon image corresponding to the newly added application in the corresponding soft key object. The character input screen display process is subsequently terminated to proceed to the process of Step SA-2 of FIG. 3.

On the other hand, when determining at Step SC-2 that an application has not been added (Step SC-2: No), the control unit 10 determines whether or not an application has been deleted based on the status information acquired from the status information file 9J at Step SC-1 (Step SC-4).

When determining at Step SC-4 that an application has been deleted (Step SC-4: Yes), the control unit 10 does not display in the soft key display area a soft key object corresponding to the application (Step SC-5). The character input screen display process is subsequently terminated to proceed to the process of Step SA-2 of FIG. 3.

On the other hand, when determining at Step SC-4 that an application has not been deleted (Step SC-4: No), the control unit 10 displays a usual character input screen without changing the soft key objects in the soft key display area (Step SC-6). The character input screen display process is subsequently terminated to proceed to the process of Step SA-2 of FIG. 3.

In this manner, according to the embodiment, it is possible to automatically adjust the configuration of soft key objects in the soft key display area in accordance with the installation state of applications. In the embodiment, when a new application is installed, it is possible to acquire an image from the application and update the image of a soft key object to be displayed in the soft key display area.

The advantages of one embodiment of the invention are that it is possible to intuitively and sufficiently select an application that can be associated with a character input function on a character input screen without reducing an area used for the character input function.

What is claimed is:

1. A mobile electronic device, comprising:
 a display configured to display a character input screen including
 a keyboard area,
 an input character display area for displaying an input character inputted via the keyboard area, and
 a soft key display area for displaying a part of soft key objects arranged in a line, wherein the soft key objects are associated with different applications;
 an operating unit configured to receive touch operations in the character input screen; and
 a control unit configured to, upon detecting a first touch operation through the operating unit,
 keep displaying the character input screen, and
 change an arrangement of the soft key objects in a move direction of the first touch operation, while the keyboard area is displayed, such that
 at least one of the soft key objects that has been displayed at a first end of the line is not displayed, and
 at least one of the soft key objects that has not been displayed is displayed at a second end of the line,
 wherein
 the control unit is further configured to change a configuration of the soft key objects to be displayed based on the character displayed in the input character display area, and
 the control unit is further configured to,
 upon detecting, by the operating unit, a second touch operation, which is different from the first touch operation, on a soft key object among the displayed soft key objects,
 execute the application associated with the soft key object operated on by the second touch operation, and utilize the input character displayed in the input character display area in the executed application, and
 the control unit is further configured to,
 upon detecting, by the operating unit, a third touch operation which moves a selected soft key object among the displayed soft key objects to and subsequently releases the selected soft key object in the input character display area,
 change a layout of the input character display area in accordance with the application associated with the selected soft key object, and
 display the input character in a field of the changed layout of the input character display area.

2. The mobile electronic device according to claim 1, wherein the first touch operation is a flick operation.

3. The mobile electronic device according to claim 1, further comprising:

a storage unit for storing arrangement information indicating the arrangement of the soft key objects to be displayed, wherein
the control unit is configured
to save, upon moving from the character input screen to another screen, the arrangement of the soft key objects into the arrangement information, and
to reproduce, upon displaying the character input screen after said another screen, the arrangement of the soft key objects based on the saved arrangement information.

4. The mobile electronic device according to claim 3, wherein
the storage unit is configured to further store status information with respect to addition and/or deletion of an application to and/or from the mobile electronic device, and
the control unit is configured to change a configuration of the soft key objects to be displayed based on the status information stored in the storage unit.

5. The mobile electronic device according to claim 4, wherein
the control unit is configured to display, upon detecting that an application has been added based on the status information stored in the storage unit, a soft key object associated with the application.

6. The mobile electronic device according to claim 4, wherein
the control unit is configured not to display, upon detecting that an application has been deleted based on the status information stored in the storage unit, a soft key object associated with the application.

7. The mobile electronic device according to claim 1, wherein
the control unit is configured
to put, upon detecting an operation to maintain selection of a soft key object among the displayed soft key objects, the selected soft key object in a movable state, and
to change, upon further detecting an operation to move and release the selected soft key object, the arrangement of the soft key objects such that the selected soft key object is displayed at a position where the operation to release the selected soft key object is detected.

8. The mobile electronic device according to claim 1, wherein
each of the soft key objects includes an image in accordance with the application associated with the soft key object.

9. The mobile electronic device according to claim 1, wherein
the control unit is configured to change the configuration of the soft key objects to be displayed by, based on the character displayed in the input character display area, hiding at least one of the soft key objects that has been displayed.

10. The mobile electronic device according to claim 9, wherein
the character displayed in the input character display area is a line feed character, and
the control unit is configured to change the configuration of the soft key objects to be displayed by, in response to the line feed character,
hiding a soft key object that has been displayed and is associated with a browser application, and
displaying a soft key object associated with a short text post site.

11. The mobile electronic device according to claim 9, wherein
the control unit is configured to change the configuration of the soft key objects to be displayed by, in response to a predetermined number of characters displayed in the input character display area,
hiding a soft key object that has been displayed and is associated with a short mail service (SMS).

12. The mobile electronic device according to claim 1, wherein
the control unit is configured to automatically adjust the configuration of the soft key objects to be displayed based on the character displayed in the input character display area, on the way to input the character.

13. The mobile electronic device according to claim 1, wherein
at least one of the soft key objects is a shortcut for executing the application associated with the soft key object.

14. A control method of a mobile electronic device including a display and an operating unit, the control method comprising:
displaying, on the display, a character input screen including
a keyboard area,
an input character display area displaying an input character inputted via the keyboard area, and
a soft key display area for displaying a part of a plurality of soft key objects arranged in a line, wherein the plurality of soft key objects are associated with different applications;
upon detecting, by the operating unit, a first touch operation in the character input screen,
keeping displaying the character input screen, and
changing an arrangement of the soft key objects in a move direction of the first touch operation, while the keyboard area is displayed, such that
at least one of the soft key objects that has been displayed at a first end of the line is not displayed, and
at least one of the soft key objects that has not been displayed is displayed at a second end of the line;
changing a configuration of the soft key objects to be displayed based on the character displayed in the input character display area;
upon detecting, by the operating unit, a second touch operation, which is different from the first touch operation, on a soft key object among the displayed soft key objects,
executing the application associated with the soft key object operated on by the second touch operation, and utilizing the input character displayed in the input character display area in the executed application; and
upon detecting, by the operating unit, a third touch operation which moves a selected soft key object among the displayed soft key objects to and subsequently releases the selected soft key object in the input character display area,
changing a layout of the input character display area in accordance with the application associated with the selected soft key object, and
displaying the input character in a field of the changed layout of the input character display area.

15. A non-transitory storage medium that stores a control program for causing, when executed by a mobile electronic device including a display and an operating unit, the mobile electronic device to execute:
displaying, on the display, a character input screen including a soft key display area for displaying a part of a plurality of soft key objects arranged in a line, wherein the plurality of soft key objects are associated with different applications, a keyboard area, and an input character display area displaying an input character inputted via the keyboard area; and upon detecting, by the operating unit, a first touch operation in the soft key display area, keeping displaying the input character display area, and changing an arrangement of the soft key objects by scrolling the soft key objects in a move direction of the first touch operation, while the keyboard area is displayed, such that at least one of the soft key objects that has been displayed at a first end of the line is not displayed, and at least one of the soft key objects that has not been displayed is displayed at a second end of the line;

changing a configuration of the soft key objects to be displayed based on the character displayed in the input character display area;

upon detecting, by the operating unit, a second touch operation, which is different from the first touch operation, on a soft key object among the displayed soft key objects, executing the application associated with the soft key object operated on by the second touch operation, and utilizing the input character displayed in the input character display area in the executed application; and upon detecting, by the operating unit, a third touch operation which moves a selected soft key object among the displayed soft key objects to and subsequently releases the selected soft key object in the input character display area, changing a layout of the input character display area in accordance with the application associated with the selected soft key object, and displaying the input character in a field of the changed layout of the input character display area.

* * * * *